United States Patent [19]
Kato et al.

[11] Patent Number: 5,502,466
[45] Date of Patent: Mar. 26, 1996

[54] DOPPLER VELOCIMETER AND POSITION INFORMATION DETECTION APPARATUS FOR USE WITH OBJECTS HAVING VARIATIONS IN SURFACE DEPTH

[75] Inventors: Shigeki Kato, Tokyo; Hidejiro Kadowaki, Yokohama; Yasuhiko Ishida; Makoto Takamiya, both of Tokyo; Jun Ashiwa; Shinji Ueda, both of Yokohama, all of Japan

[73] Assignee: Canon Kabushiki Kaisha, Tokyo, Japan

[21] Appl. No.: 266,740

[22] Filed: Jun. 28, 1994

[30] Foreign Application Priority Data

Jun. 29, 1993 [JP] Japan .................................. 5-184426
May 31, 1994 [JP] Japan .................................. 6-118548

[51] Int. Cl.$^6$ ...................................................... G01B 9/02
[52] U.S. Cl. ........................... 356/356; 356/28.5; 356/349
[58] Field of Search ........................ 356/35.5, 28, 28.5, 356/345, 349, 356

[56] References Cited

U.S. PATENT DOCUMENTS 4,895,447  1/1990  Jarisch et al. ........................... 356/356
5,327,222  7/1994  Takamiya et al. ...................... 356/28.5

Primary Examiner—Samuel A. Turner
Assistant Examiner—Robert Kim
Attorney, Agent, or Firm—Fitzpatrick, Cella, Harper & Scinto

[57] ABSTRACT

A position information detection apparatus includes a first detection system for radiating two collimated light beams onto an object to be measured at a predetermined crossing angle to form interference fringes at a predetermined interval, and detecting scattered light emanating from the object to be measured by the interference fringes at the predetermined interval, a second detection system for radiating two light beams onto the object to be measured at a predetermined crossing angle to form interference fringes having a gradient with each other in an opposing direction to the object to be measured, and detecting scattered light emanating from the object to be measured by the interference fringes having the gradient, and a detection unit for comparing output signals from the first and second detection systems, and detecting relative position information, along the opposing direction of the first and second detection systems, of the object to be measured.

19 Claims, 20 Drawing Sheets

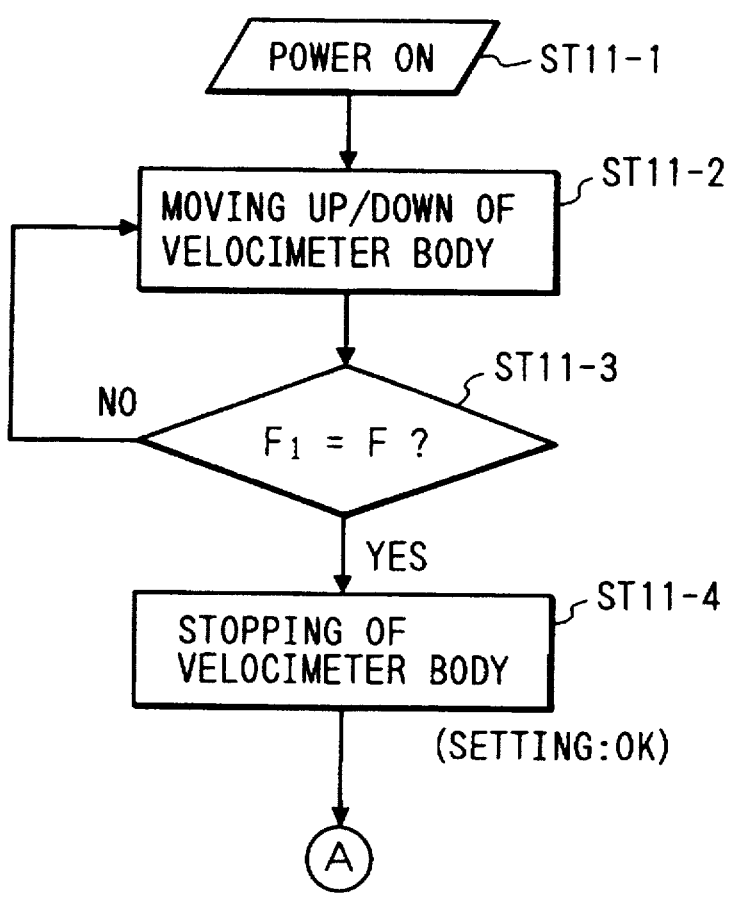

| FIG. 7A |
| FIG. 7B |

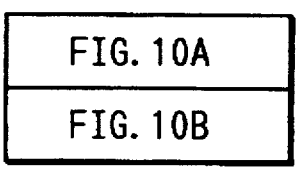
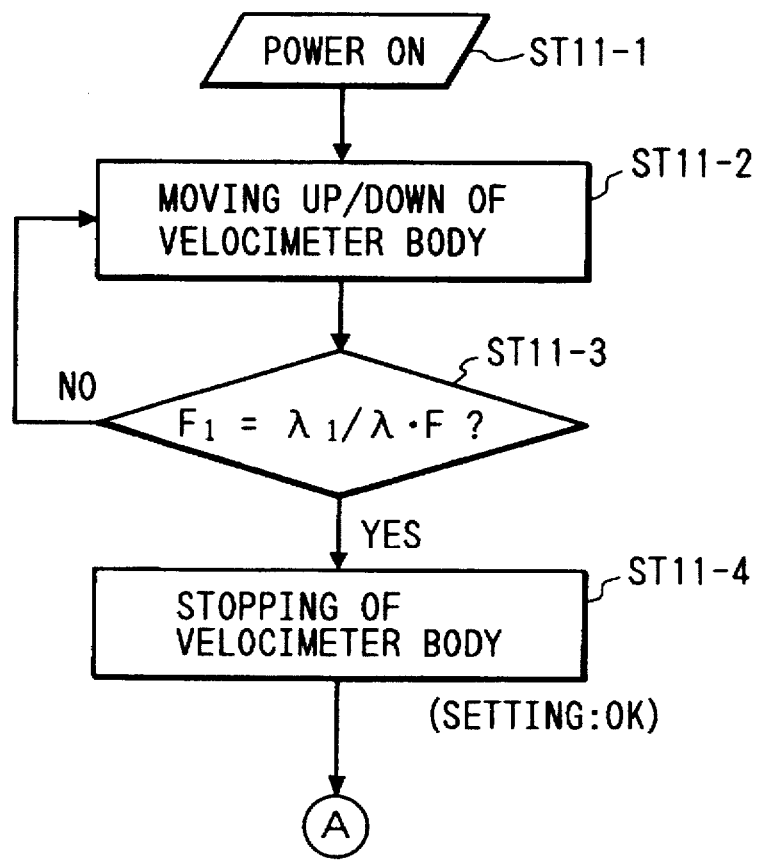

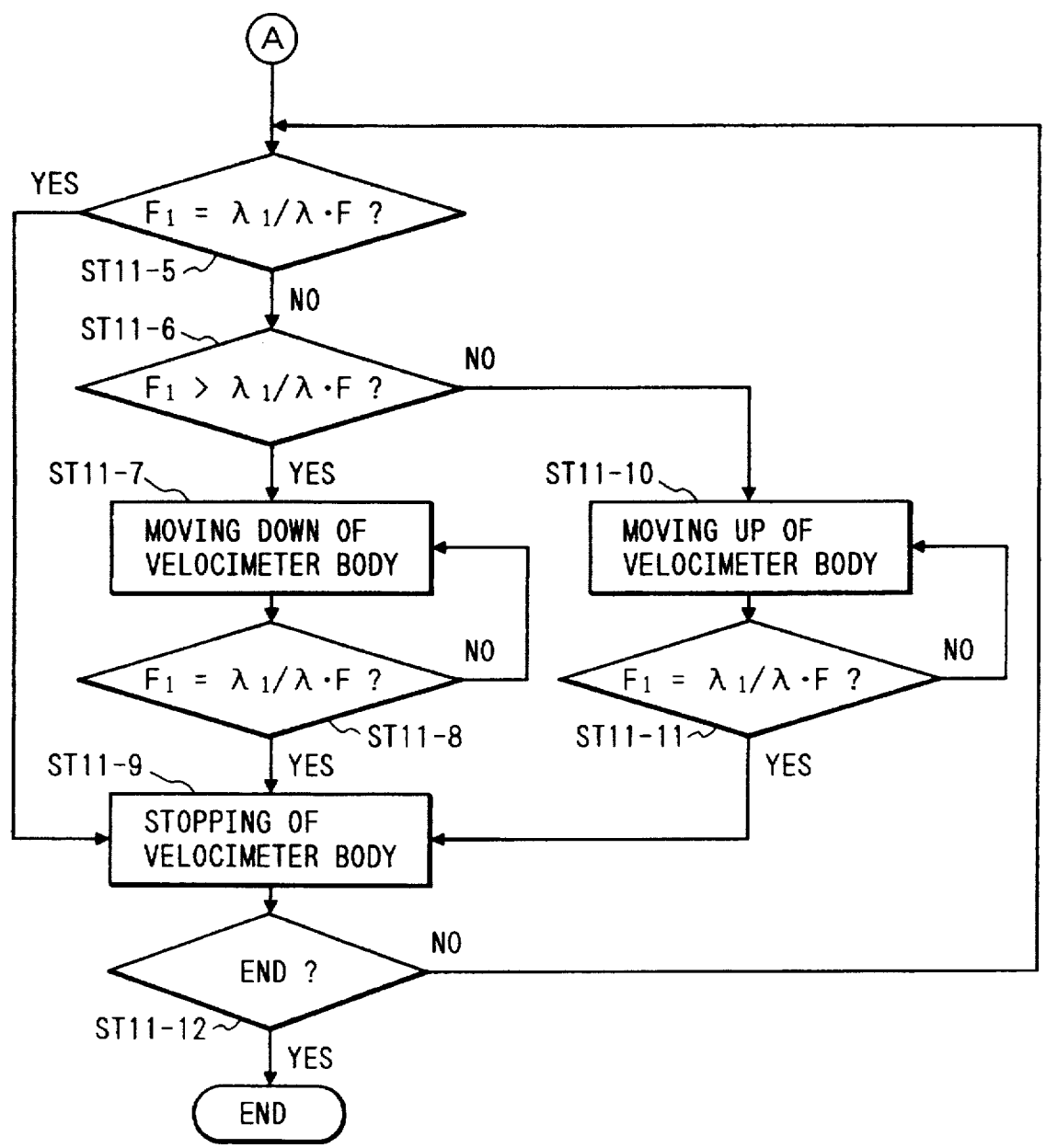

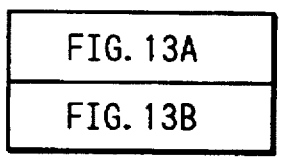
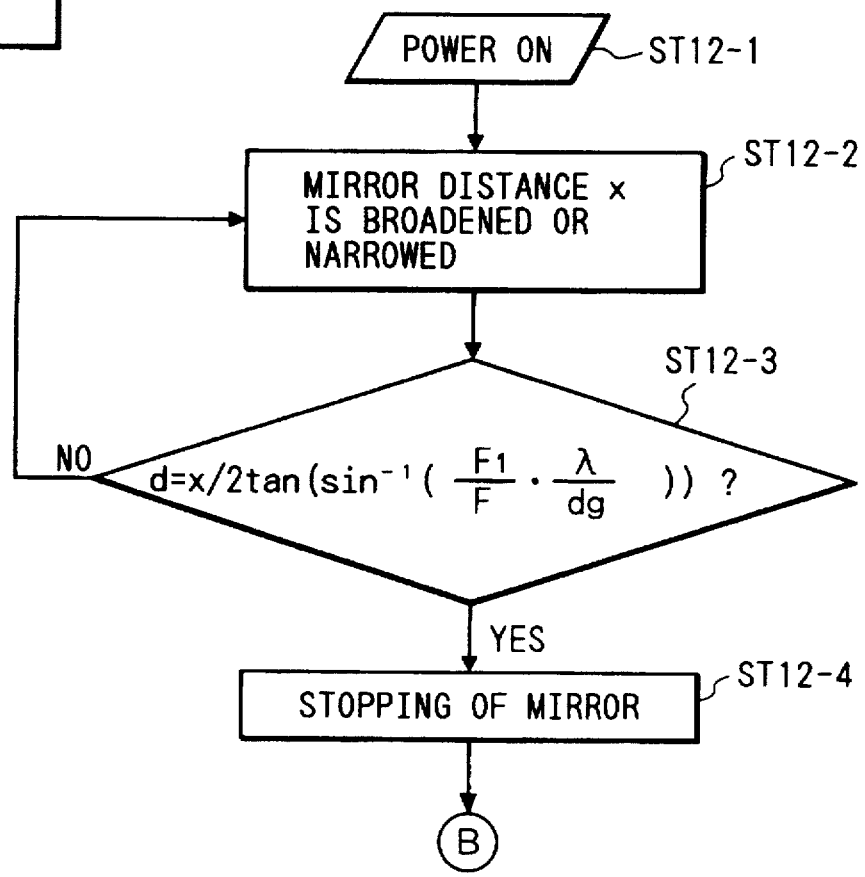

DOPPLER VELOCIMETER AND POSITION INFORMATION DETECTION APPARATUS FOR USE WITH OBJECTS HAVING VARIATIONS IN SURFACE DEPTH

BACKGROUND OF THE INVENTION

1. Field of the Invention

The present invention relates to a velocimeter and a position information detection apparatus and, more particularly, to a velocimeter and a position information detection apparatus which can be suitably applied to a Doppler velocimeter for accurately measuring the moving velocity and the moving distance of a moving object or fluid in a non-contact manner.

2. Related Background Art

As is well known, a Doppler velocimeter is an apparatus for measuring the moving velocity and the moving distance of a moving object or fluid by utilizing the fact that a light beam is modulated by diffraction or interference generated upon radiation of a laser beam onto a moving object or fluid.

FIG. 1A shows an example of diffraction which occurs when a laser beam I from a laser diode 1 is incident on a transmission type diffraction grating 10 in an alignment direction t of grating lines with a grating line pitch dg. If m represents the order (1, 2, ...) of diffraction, and λ represents the wavelength of light, a diffraction angle $\theta_0$ is given by:

$$\sin \theta_0 = m\lambda/dg \quad (1)$$

The diffraction angle of ±n-th order light components (n=1, 2, ...) other than 0-th order light is given by:

$$\sin \theta_0 = \pm n \, \lambda/dg \quad (2)$$

FIG. 1B is a view showing a state wherein ±n-th order diffracted light components 5a and 5b transmitted through the diffraction grating 10 are reflected by mirrors 6a and 6b to have an incident angle $\theta_0$ on an object 7 to be measured as a moving object. A Doppler frequency F detected by a photodetector 9 which receives divergent light from the object 7 to be measured, which is moving at a velocity V is given by:

$$F = 2V \sin \theta_0/\lambda = 2n \, V/dg \quad (3)$$

Thus, the frequency F does not depend on the wavelength λ of the laser beam I, is inversely proportional to the grating line pitch dg of the diffraction grating 10, and is proportional to the velocity V of the object 7 to be measured. Since the grating line pitch dg is sufficiently stable, the Doppler frequency F is a frequency which is proportional to only the velocity V of the object 7 to be measured.

In FIG. 1B, a lens 8 focuses light reflected by the object 7 to be measured on the photodetector 9, and a velocimeter body 61 holds the above-mentioned constituting members. The mirrors 6a and 6b are separated by a distance L, and the diffraction grating 10 and the object 7 to be measured are separated by a measurement distance h. The diffraction grating 10 may be replaced by a reflection type diffraction grating.

A conventional laser Doppler velocimeter shown in FIG. 1C includes an optical system, which radiates a laser beam onto the object 7 to be measured, so that an incident angle θ changes in correspondence with a change in wavelength λ of the laser beam, and sin θ/λ becomes constant. The optical system is constituted by the diffraction grating 10 for forming ±n-th order diffracted light components (n=1, 2, 3, ...) by diffracting the laser beam, and two lenses 11L and 12L having an equal focal length f. The distance between the two lenses 11L and 12L is set to be twice the focal length f. These constituting members are held on a velocimeter body 101 while maintaining a predetermined positional relationship.

With this arrangement, a shift between two crossing light beams upon variation of the wavelength can be minimized. A laser beam from the laser diode 1 is collimated by a collimator lens 2 to a collimated beam 3 having a beam spot size of 1.2 mm, and the collimated beam 3 is incident in the alignment direction of the transmission type diffraction grating 10 having a grating line pitch of 3.2 μm.

When ±1st-order diffracted light components 5a and 5b obtained from the transmission type diffraction grating 10 are incident on the convex lens 11L having the focal length f, light beams 13a and 13b are obtained, as shown in FIG. 1C. When these light beams 13a and 13b are incident on the other convex lens 12L separated from the lens 11L by 2f, collimated beams 14a and 14b are obtained again. Then, the collimated beams 14a and 14b having a beam spot size of 1.2 mm are radiated onto the object 7 to be measured, which is moving in the direction of an arrow 7a in FIG. 1C, at an angle equal to the diffraction angle θ from the above-mentioned diffraction grating 10.

Since divergent light from the object 7 to be measured is efficiently focused on a light-receiving portion 9a of the photodetector 9 via the convex lens 12L and the focusing lens 8, the Doppler frequency F can be detected by the following equation:

$$F = 2V/dg \quad (4)$$

Assuming that the wavelength λ of the laser diode 1 changes, θ varies in correspondence with dg sin θ=λ, but the Doppler signal does not change as in the above-mentioned apparatus. In this apparatus, the spot positions of two light beams can be set to be immovable. More specifically, since the object 7 to be measured is immovable, no positional shift between the spots occurs, and a proper beam crossing state is always maintained. Since a distance a between the diffraction grating 10 and the convex lens 11L<a distance b between the convex lens 12L and the object 7 to be measured, the distance b is relatively large, and a large working distance can be assured, resulting in a high degree of freedom in terms of velocity design. In addition, temperature dependence of measurement accuracy is very small, and high-accuracy velocity measurement can be realized.

However, in the conventional laser Doppler velocimeter, an object to be measured must be present within a range where interference fringes are formed upon crossing of laser beams. In the arrangement of the conventional laser Doppler velocimeter shown in FIG. 1C, the beam spot size of the laser beam is set to be 1.2 mm, and the laser crossing angle is set to be 12°. For this reason, a range where interference fringes to be sufficiently measured are formed, i.e., the measurable range is 20±1 mm from the convex lens 12L by actual measurement. For example, when the moving velocity of a steel plate is to be measured, if the steel plate suffers a three-dimensional surface pattern or a warp, a depth nonuniformity of only 2 mm is allowed.

SUMMARY OF THE INVENTION

It is the first object of the present invention to provide a velocimeter and a position information detection apparatus, which can cope with a variation, in the depth direction, of an object to be measured without making the apparatus arrangement large.

Other objects and features of the present invention will become apparent from the following description of the embodiments.

BRIEF DESCRIPTION OF THE DRAWINGS

FIG. 10 is comprised of FIGS. 10A and 10B showing flow charts for explaining a control operation of the third embodiment;

DESCRIPTION OF THE PREFERRED EMBODIMENTS

Figure 1A:
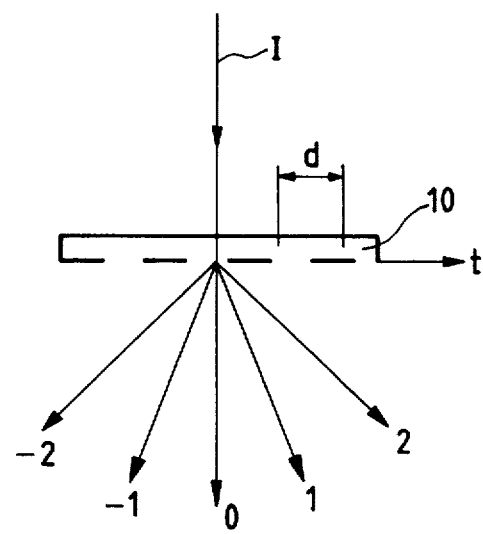
FIG. 1A is a view showing a diffraction state formed when a laser beam 1 is incident on a transmission type diffraction grating having a grating line pitch d in the alignment direction of grating lines.
Figure 1B:
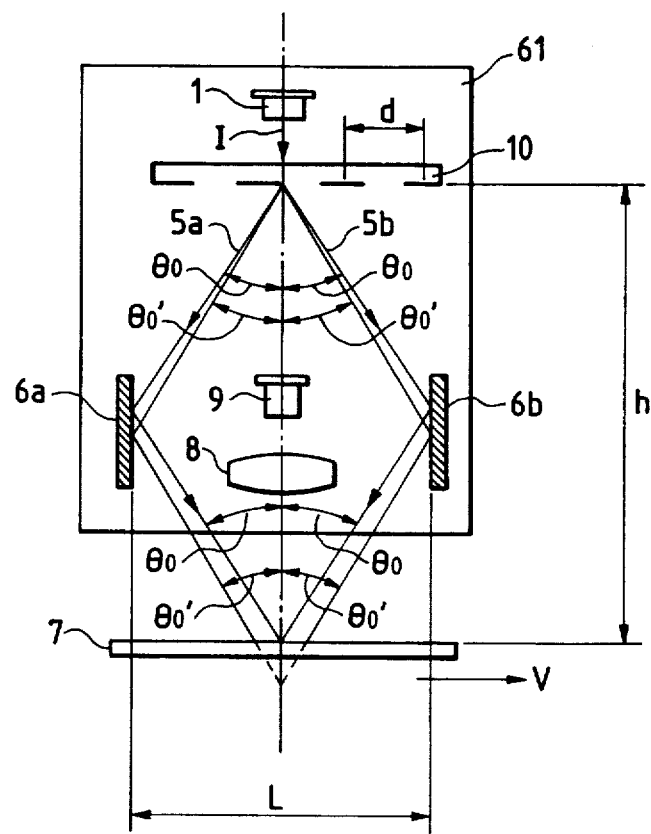
FIG. 1B is a view showing a state wherein ±n-th order light components diffracted by the diffraction grating shown in FIG. 1A are reflected by a mirror optical system to have an incident angle $\theta_0$ on an object to be measured.
Figure 1C:
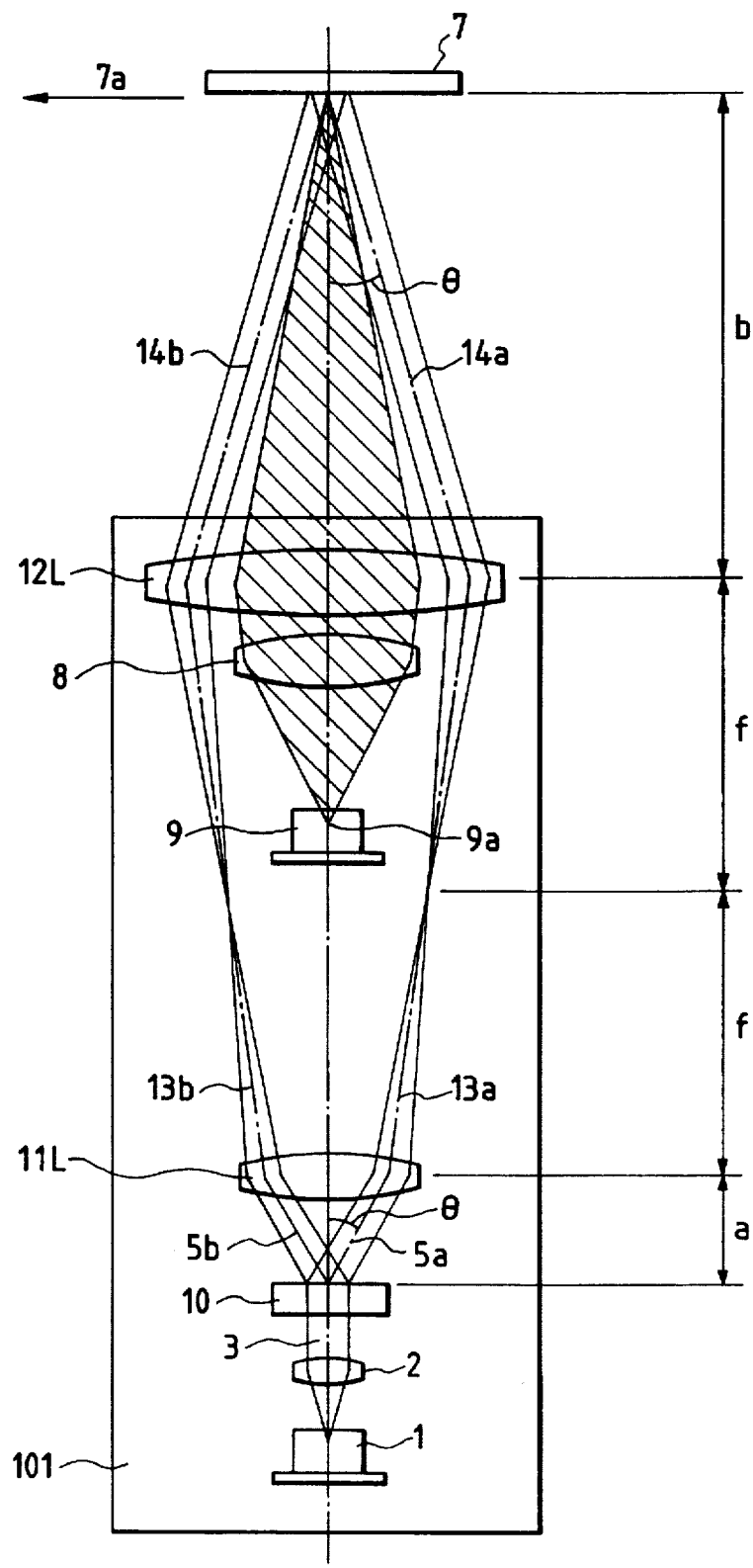
FIG. 1C is a view showing the arrangement obtained when the mirror optical system shown in FIG. 1B is constituted by a lens optical system.
Figure 2A:
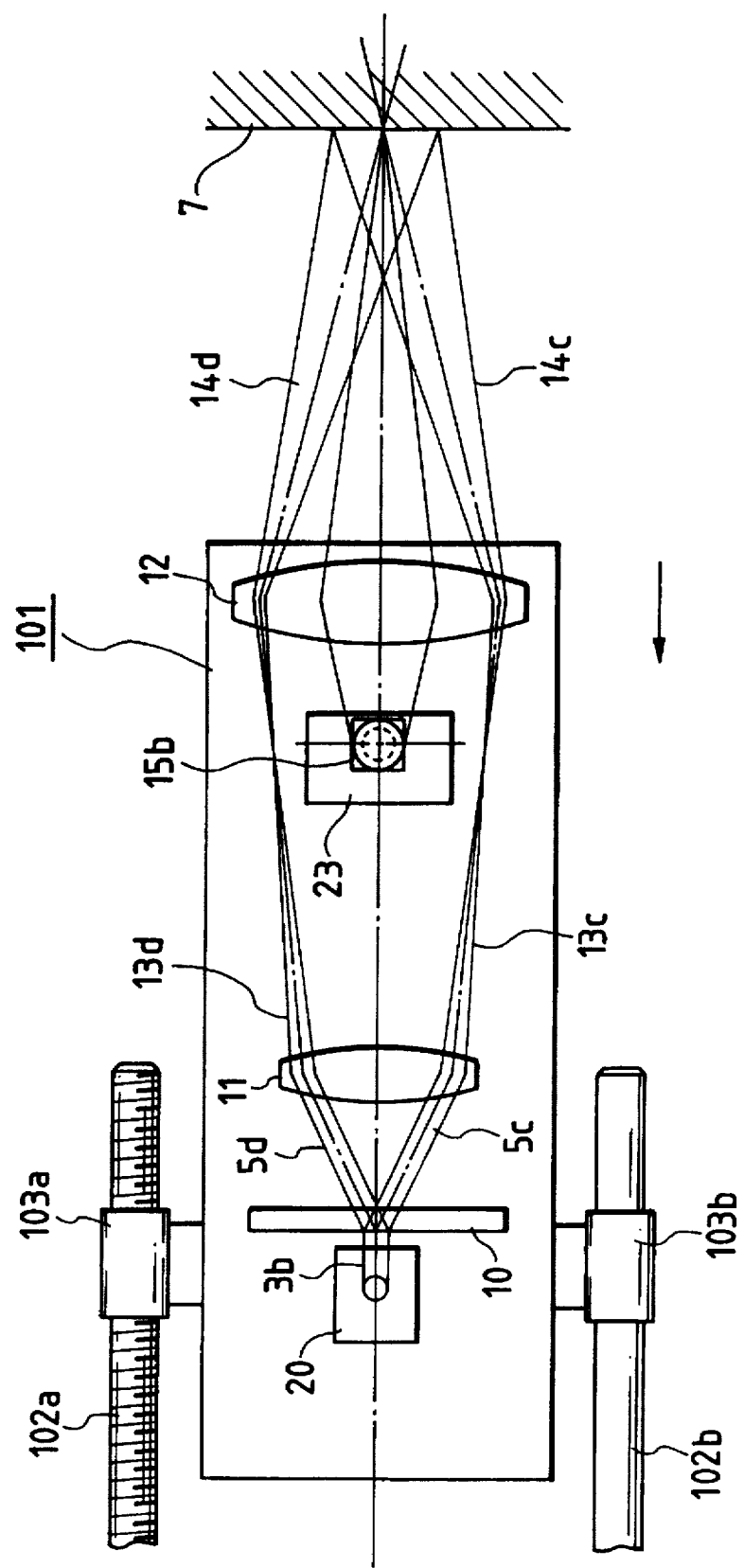
FIG. 2A is an optical path diagram of divergent light in the first embodiment of the present invention.
Figure 2B:
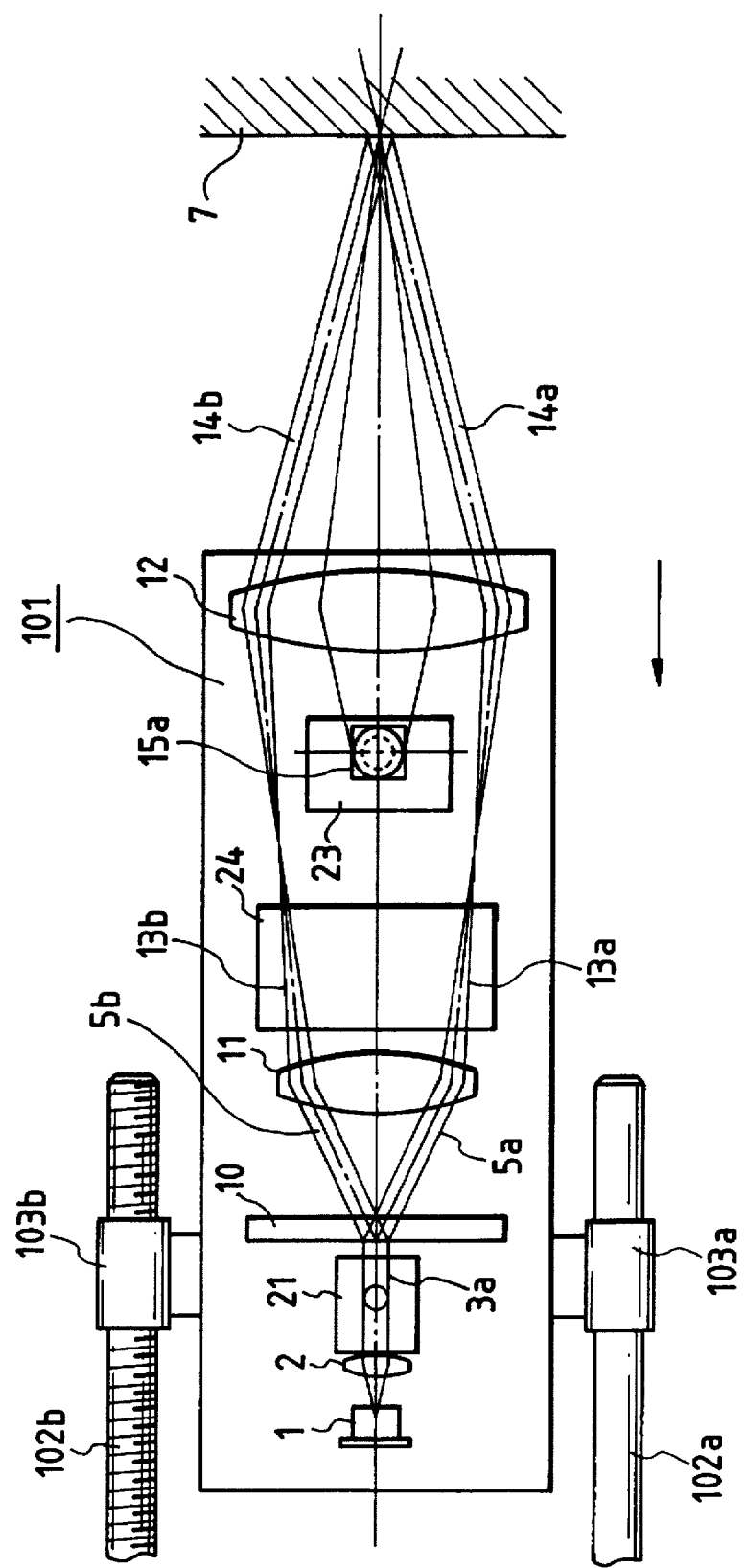
FIG. 2B is an optical path diagram of collimated light in the first embodiment of the present invention.
Figure 2C:
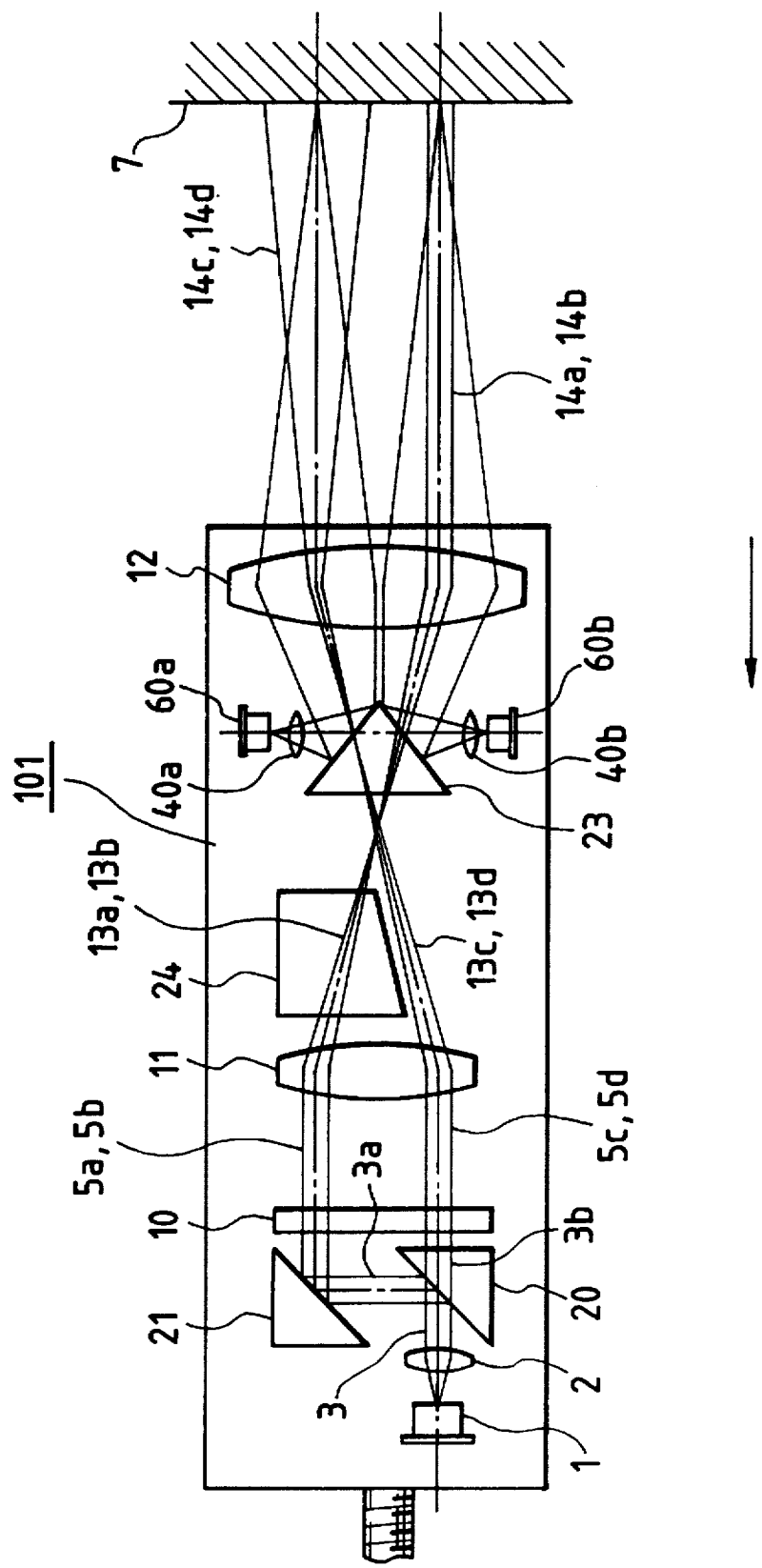
FIG. 2C is a side view of a laser Doppler velocimeter in the first embodiment of the present invention.

FIGS. 2A to 2C show the arrangement of a laser Doppler velocimeter according to the first embodiment of the present invention. FIG. 2A shows the optical path portion of divergent light, FIG. 2B shows the optical path portion of collimated light, and FIG. 2C is a side view of the laser Doppler velocimeter.

A laser beam having a wavelength $\lambda$ of about 0.68 μm and emitted from a laser diode 1 is collimated by a collimator lens 2 into a collimated beam 3 having a beam spot size of 1.2 mm. The collimated beam 3 is split into two beams by a beam splitter 20. Of these two beams, a light beam 3a reflected at a right angle by the beam splitter 20 is reflected by a mirror 21 in a direction parallel to a light beam 3b, as shown in FIGS. 2B and 2C, and is incident on a transmission type diffraction grating 10 having a grating line pitch dg= 3.2 μm in a direction perpendicular to the grating line alignment direction of the diffraction grating 10. The incident light beam 3a is split into ±1st-order diffracted light components 5a and 5b.

The ±1st-order diffracted light components 5a and 5b emerge from the diffraction grating 10 at a diffraction angle $\theta=12°$, and are incident on a convex lens 11 having a focal length f, thus obtaining light beams 13a and 13b, as shown in FIG. 2B. The light beams 13a and 13b are incident on another convex lens 12 via a prism 24, thus obtaining light beams 14a and 14b, as shown in FIG. 2B. When the distance between the lenses 11 and 12 is set to obtain collimated beams 14a and 14b, the light beams 14a and 14b are incident on an object 7 to be measured to have an incident angle equal to the diffraction angle $\theta$ from the above-mentioned diffraction grating 10, and a beam spot size of 1.2 mm.

With these beams, interference fringes are formed on the object 7 to be measured at a predetermined interval, and when the diffraction angle $\theta$ is equal to an angle $\theta_n$ half the crossing angle of the two beams on the object to be measured, an interference fringe pitch p is given by:

$$p = dg/2 \tag{6}$$

Light reflected by the object 7 to be measured 7 is split into two beams in opposite directions by a mirror 23 via the lens 12, and these light beams are incident on photodetectors 60a and 60b via focusing lenses 40a and 40b. Therefore, when the object 7 to be measured is moving at a velocity V, a Doppler frequency F given by the following equation (7) is obtained from an optical signal including a Doppler frequency signal and detected by the photodetector 60b. A calculator (not shown) calculates a velocity based on equation (7):

$$F = 2V/dg \tag{7}$$

On the other hand, the other light beam 3b split by the beam splitter 20 is transmitted through the beam splitter 20, as shown in FIGS. 2A and 2C, is incident on the diffraction grating 10 in a direction perpendicular to the grating line alignment direction of the diffraction grating 10 in the same manner as the light beam 3a, and is split into light beams 5c and 5d. The light beams 5c and 5d are transmitted through the convex lenses 11 and 12, and are incident on the object to be measured as divergent beams 14c and 14d. With these beams, interference fringes depending on the depth (in the up-and-down direction of FIGS. 2A to 2C) are formed, and an interference pitch $p_1$ is given by the following equation (8):

$$p_1 = \lambda/2 \sin \theta_n \tag{8}$$

where $\theta_n$ is the crossing angle of the central rays in the light beam crossing portion. As is apparent from the above equation, the pitch, $p_1$, of the interference fringes formed by crossing divergent light will vary with the crossing angle of the central rays, $\theta_n$. As a result, the pitch of the interference fringes will vary with the perpendicular distance from the object, i.e., the interference fringes will not be parallel to each other, but instead will have a gradient with each other in an opposing direction to the object to be measured.

Light reflected by the object 7 to be measured on the basis of the interference pitch $p_1$ is transmitted through the lens 12, and is split into two beams in opposite directions by the mirror 23. These two beams are respectively incident on the photodetectors 60a and 60b via the focusing lenses 40a and 40b. As a result, a Doppler frequency signal obtained by the photodetector 60a, i.e., a Doppler frequency $F_1$ of a reference signal is given by the following equation (9):

$$F_1 = 2V \sin \theta_n / \lambda \tag{9}$$

The pitch p of interference fringes formed at a position in the depth direction (the up-and-down direction of FIGS. 2A to 2C) where the crossing angle $\theta_n$ of the central rays in the beam crossing portion of the two beams becomes equal to the diffraction angle $\theta$ is equal to the interference fringe pitch given by equation (6) above, and this position is equal to a position where the collimated beams emerging from the convex lens 12 cross each other.

Therefore, as the Doppler frequency signal obtained in correspondence with the velocity V of the moving object 7 to be measured, when the crossing position of the collimated beams 14a and 14b emerging from the convex lens 12 is defined as a proper measurement point, if the object 7 to be measured is present, e.g., before this proper measurement point, the photodetector 60a generates a Doppler frequency signal having a frequency higher than that from the photodetector 60b, i.e., a reference signal.

Screw shafts 102a and 102b constituting a mechanism for moving a main body in the back-and-forth direction are rotated by a driving source (not shown) on the basis of the reference signal, thereby moving a velocimeter body 101, on which cylindrical nuts 103a and 103b to be threadably engaged with these screw shafts 102a and 102b project from the two sides, in the direction of an arrow in FIGS. 2A to 2C, until the frequencies of the signals obtained from the photodetectors 60a and 60b become equal to each other. In this case, the distance between the velocimeter body 101 and the object 7 to be measured is controlled by a CPU (not shown) as a position discrimination means.

Figure 3B:
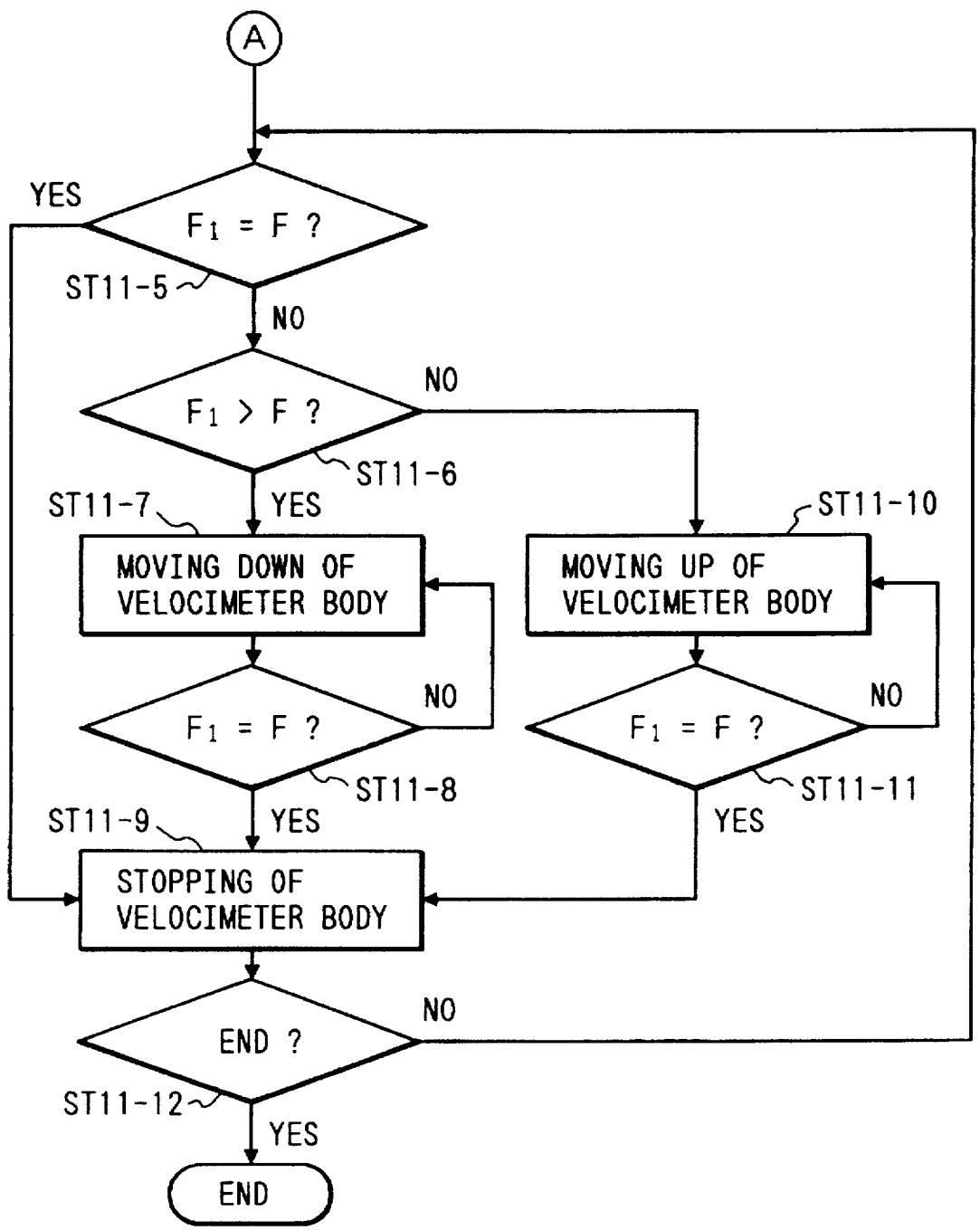
FIG. 3 is comprised of FIGS. 3A and 3B showing flow charts for explaining a control operation of the first embodiment.

The control operation of the CPU of the first embodiment will be described below with reference to the flow chart in FIGS. 3A and 3B.

After the power supply of the velocimeter body 101 is turned on in step ST11-1, the screw shafts 102a and 102b are rotated in step ST11-2 to move the velocimeter body 101 up (upward) or down (downward) with respect to the object 7 to be measured. It is checked in step ST11-3 if the Doppler frequencies of the outputs from the photodetectors 60a and 60b satisfy $F_1=F$ during movement of the velocimeter body 101. If YES in step ST11-3, it is determined that the velocimeter body 101 has reached a proper measurement position, and the screw shafts 102a and 102b are stopped in step ST11-4 to stop the movement of the velocimeter body, thus maintaining this state.

When the velocimeter 101 has reached the proper measurement position, servo control is started. It is checked in step ST11-5 if the Doppler frequency $F_1$ of the output from the photodetector 60a is equal to the Doppler frequency F of the output from the photodetector 60b. If NO in step ST11-5, it is checked in step ST11-6 if $F_1>F$. If YES in step ST11-6, the screw shafts 102a and 102b are rotated in step ST11-7 to move the velocimeter body 101 down, thus bringing the velocimeter body 101 close to the object 7 to be measured 7. It is checked again in step ST11-8 if $F_1=F$. If YES in step ST11-8, the screw shafts 102a and 102b are stopped in step ST11-9, and the velocimeter body 101 is stopped at that position.

On the other hand, if NO in step ST11-6, the flow advances to step ST11-10 to rotate the screw shafts 102a and 102b in a direction opposite to that described above, thereby moving the velocimeter body 101 up, i.e., bringing the velocimeter body 101 farther from the object 7 to be measured. It is checked again in step ST11-11 if $F_1=F$. If YES in step ST11-11, the flow advances to step ST11-9 to stop the screw shafts 102a and 102b, thus stopping the velocimeter body 101. It is checked in step ST11-12 if an operation ends. If NO in step ST11-12, the flow returns to step ST11-5 to repeat the above-mentioned operation.

With this control, even when the surface of the object 7 to be measured is wavy like a steel plate, the distance to the object 7 to be measured can be reliably adjusted. Therefore, a laser Doppler velocimeter which can reliably measure the velocity even when the distance to the object 7 to be measured changes can be realized.

Figure 4:
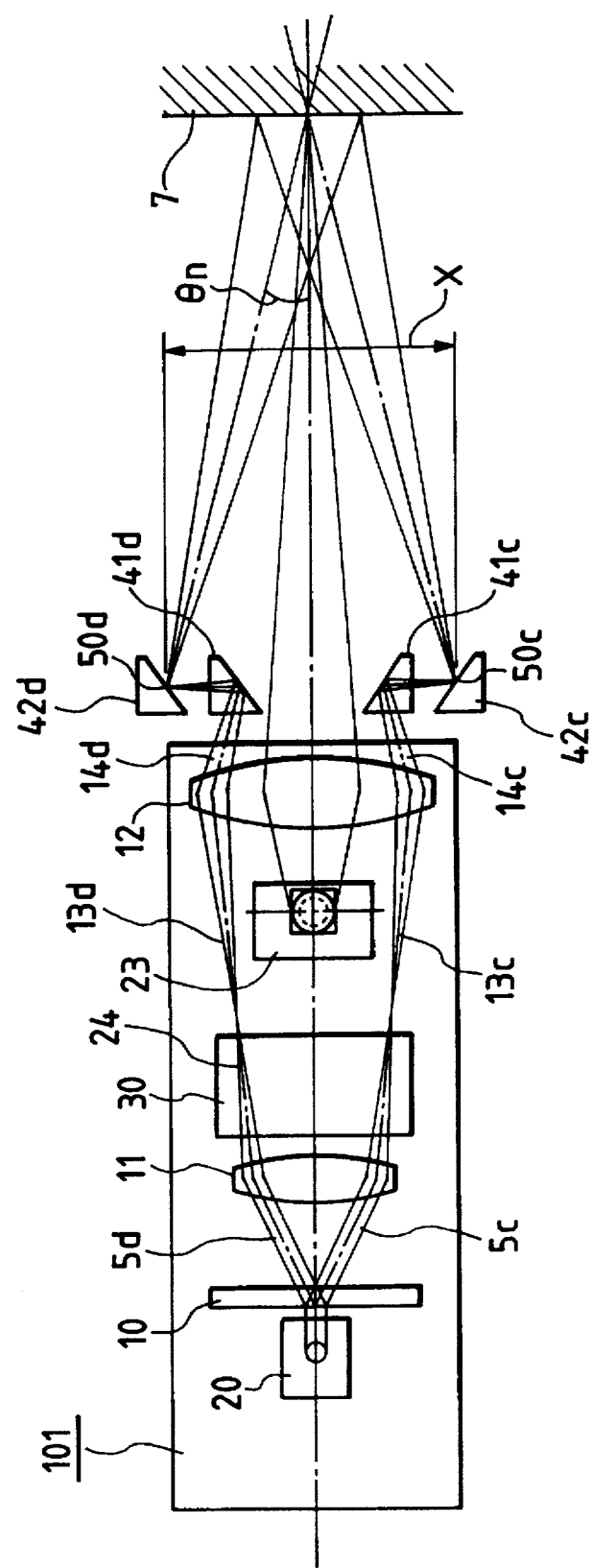
FIG. 4 is an optical path diagram of divergent light in the second embodiment of the present invention.
Figure 5:
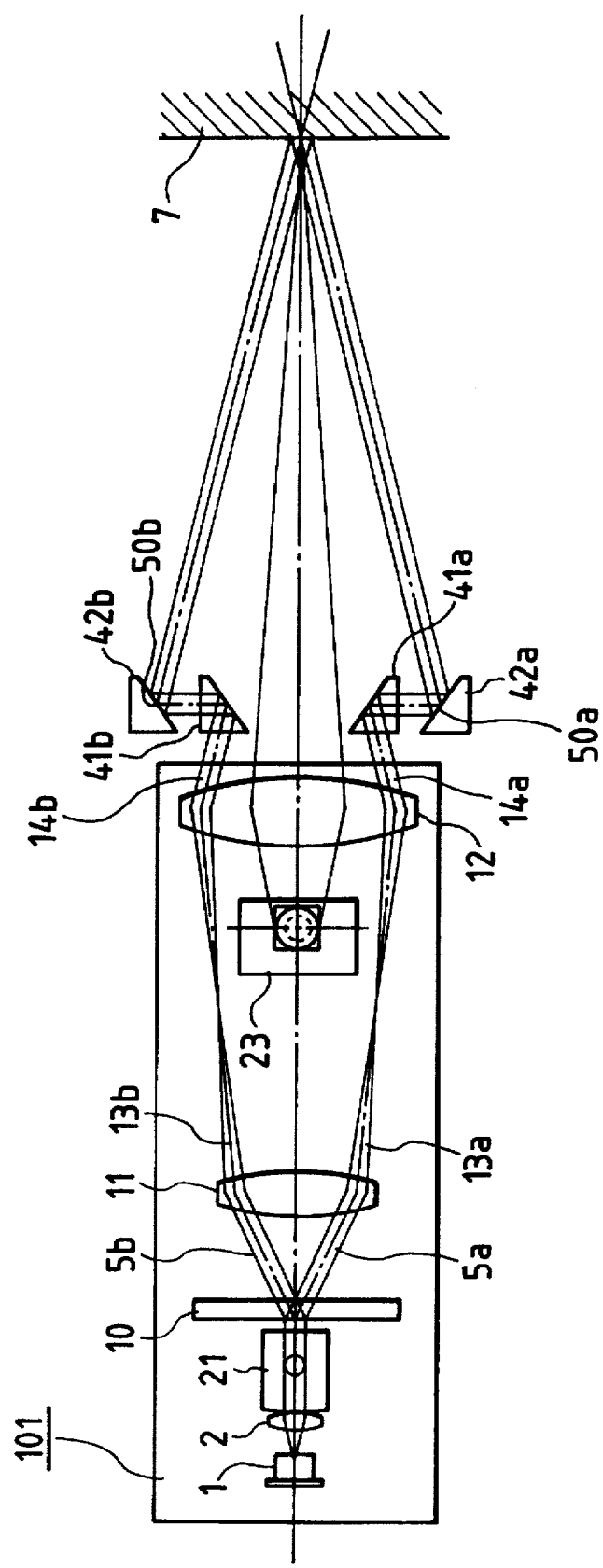
FIG. 5 is an optical path diagram of collimated light in the second embodiment of the present invention.
Figure 6:
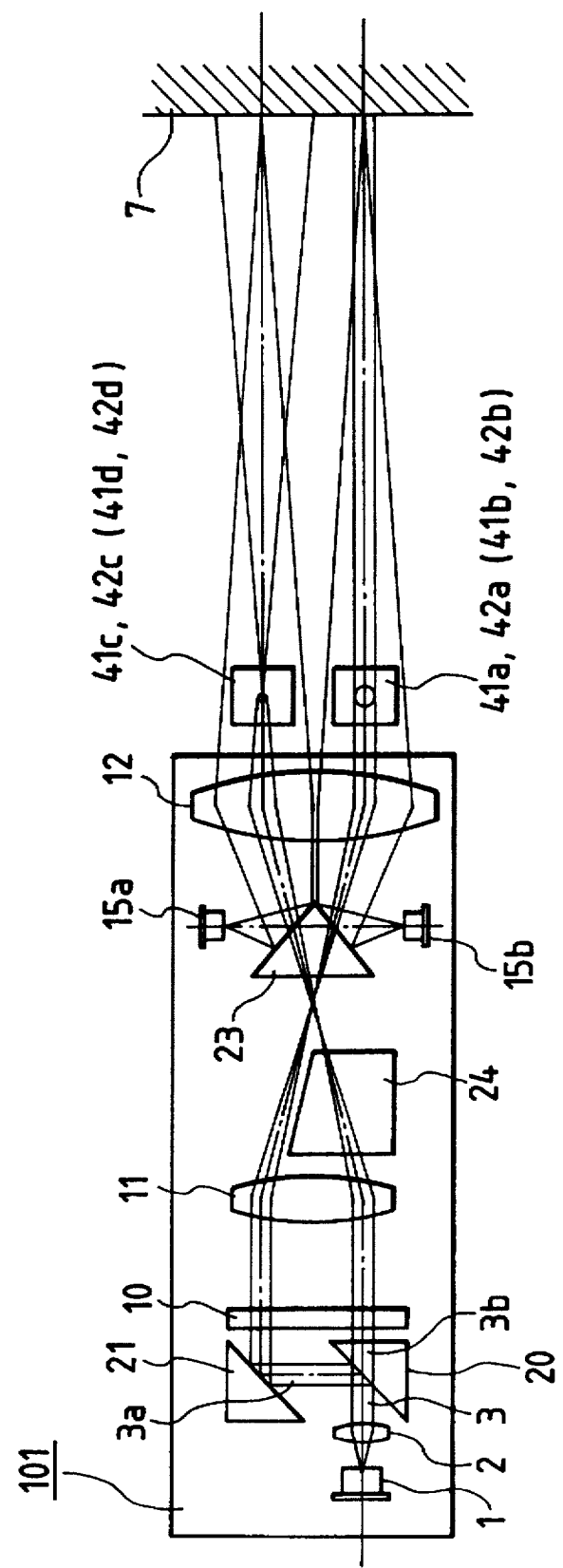
FIG. 6 is a side view of a laser Doppler velocimeter in the second embodiment of the present invention.

FIGS. 4 to 6 show the arrangement of a laser Doppler velocimeter according to the second embodiment of the present invention. FIG. 4 shows the optical path portion of divergent light, FIG. 5 shows the optical path portion of collimated light, and FIG. 6 is a side view of a laser Doppler velocimeter.

In the second embodiment, pairs of mirrors 41a and 42a, 41b and 42b, 41c and 42c, and 41d and 42d are respectively inserted in the optical paths of the light beams 14a to 14d transmitted through the lens 12. Contrary to the first embodiment, light beams become divergent beams when they are transmitted through the prism 24, and light beams become collimated beams when they are not transmitted through the prism 24. Since other arrangements are the same as those in the first embodiment, the same reference numerals in this embodiment denote the same parts as in the first embodiment, and a repetitive description thereof will be avoided. The mirrors 41a and 42a, 41b and 42b, 41c and 42c, and 41d and 42d are arranged, so that their reflection surfaces are parallel to each other, and the mirrors denoted by the same reference numerals are arranged symmetrical about the light-receiving optical axis. Each of the mirrors 41a and 41d, and the mirrors 41b and 41c are integrally arranged, and the mirrors 41a and 41b and the mirrors 41c and 41d are movable in the interval direction to be symmetrical about the light-receiving optical axis.

The operation of the second embodiment will be described below. When the passing lengths of the light beams 13c and 13d are set, so that the two focusing light beams 14c and 14d are focused on points 50c and 50d on the mirrors 42c and 42d via the mirrors 41c and 41d, a distance (ideal distance) $d_1$ between the points 50c and 50d on the mirrors 42c and 42d, and the object 7 to be measured is obtained by calculating the following equation by a CPU (not shown) as a distance calculation means and a distance control means. Note that X is the interval between the points 50c and 50d, and is measured by a measurement means (not shown).

$$d_1 = X/2 \tan \theta_n \tag{10}$$

Furthermore, from equations (7) and (8), we have:

$$d_1 = X/2 \tan \left( \sin^{-1} \left( \frac{F_1}{F} \cdot \frac{\lambda}{dg} \right) \right) \tag{11}$$

If $\theta$ is sufficiently small, and the variation, in the depth direction, of the object 7 to be measured is small, the displacement, in the direction of the light-receiving optical axis, of the points 50a and 50b upon movement of the mirrors 41c and 41d is negligibly small. For this reason, using equation (11), the distance $d_1$ between the points 50a and 50b, and the object 7 to be measured, and the variation in this distance can be obtained. On the other hand, the distance d between the crossing position of the light beams 14a and 14b, and the points 50a and 50b is given by d=X/(2 tan θ).

Figures 7, 7A:
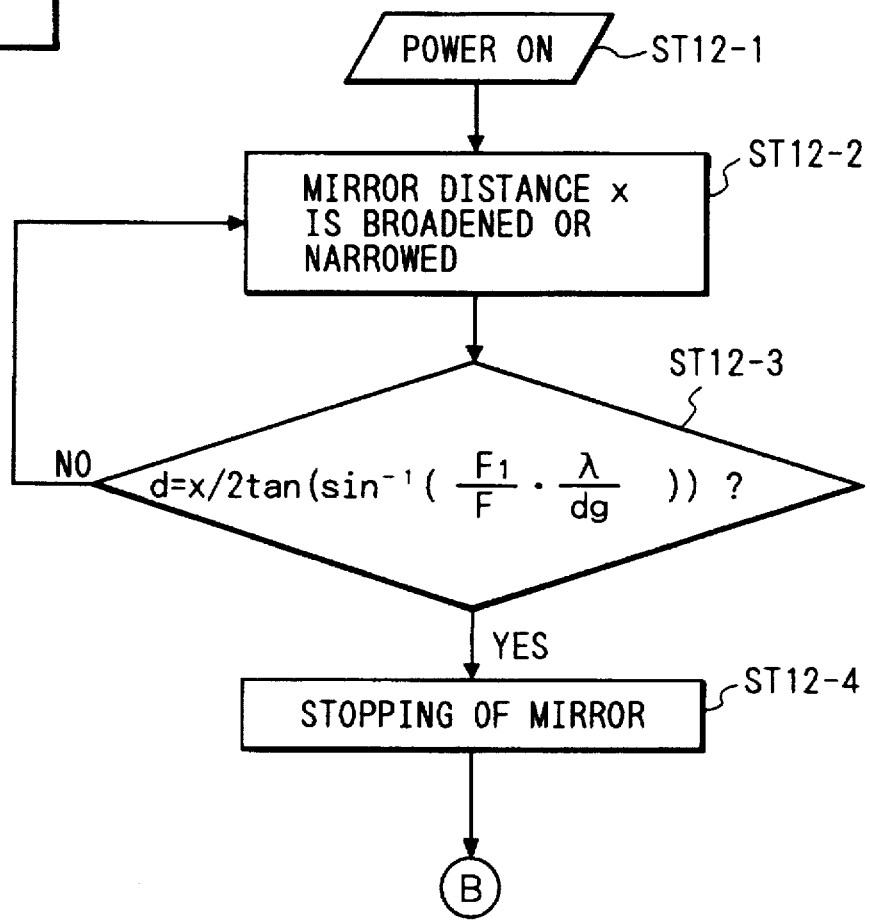
FIG. 7 is comprised of FIGS. 7A and 7B showing flow charts for explaining a control operation of the second embodiment.
Figure 7B:
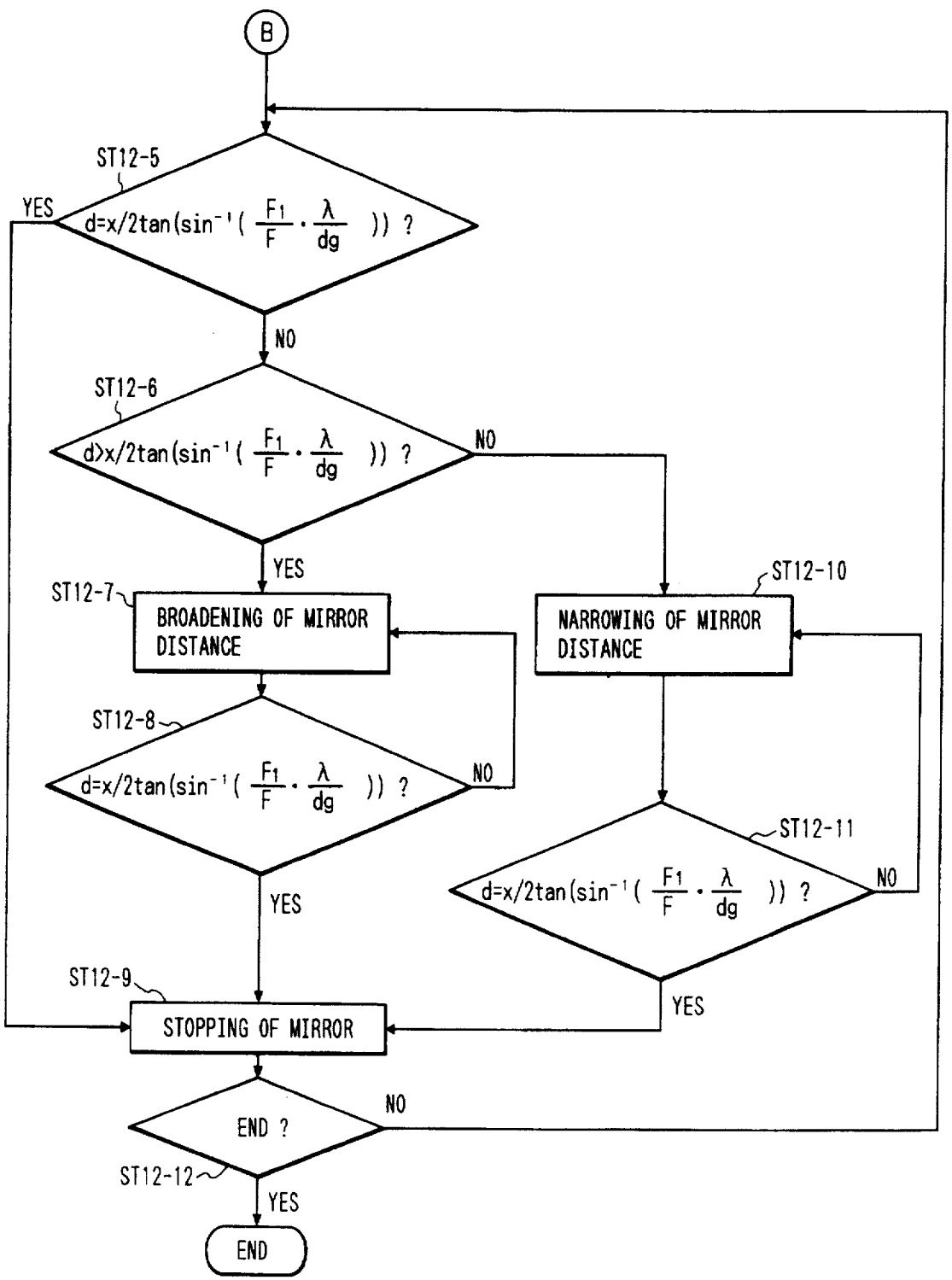

The control operation of the CPU of the second embodiment will be described below with reference to the flow chart in FIGS. 7A and 7B.

After the power supply is turned on in step ST12-1, the interval X between the mirrors 41a and 41b is increased or decreased by exciting, e.g., a voice coil in step ST12-2. It is checked in step ST12-3 if $$d = X/2\tan\left(\sin^{-1}\left(\frac{F_1}{F} \cdot \frac{\lambda}{dg}\right)\right).$$

If YES in step ST12-3, the mirrors 41a and 41b are stopped in step ST12-4.

After the mirrors 41a and 41b are arranged at proper positions, the operation for controlling the positions of the mirrors 41a and 41b to satisfy $d_1=d$ (where $d_1$ is the ideal distance and d is the distance between the crossing position of the two collimated beams 14a and 14b transmitted through the lens 12, and the points 50a and 50b on the mirrors 42a and 42b) is started.

It is checked in step ST12-5 if $$d = X/2\tan\left(\sin^{-1}\left(\frac{F_1}{F} \cdot \frac{\lambda}{dg}\right)\right).$$

If NO in step ST12-5, it is checked in step ST12-6 if $$d > X/2\tan\left(\sin^{-1}\left(\frac{F_1}{F} \cdot \frac{\lambda}{dg}\right)\right).$$

If YES in step ST12-6, the flow advances to step ST12-7 to increase the interval X between the mirrors 41a and 41b. Thereafter, it is checked again in step ST12-8 if $$d = X/2\tan\left(\sin^{-1}\left(\frac{F_1}{F} \cdot \frac{\lambda}{dg}\right)\right).$$

If YES in step ST12-8, the flow advances to step ST12-9 to stop the mirrors 41a and 41b.

On the other hand, if NO in step ST12-6, the interval X between the mirrors 41a and 41b is decreased in step ST12-10, and it is checked in step ST12-11 if $$d = X/2\tan\left(\sin^{-1}\left(\frac{F_1}{F} \cdot \frac{\lambda}{dg}\right)\right).$$

If YES in step ST12-11, the flow advances to step ST12-9 to stop the mirrors 41a and 42b. It is then checked in step ST12-12 if an operation ends. If NO in step ST12-12, the flow returns to step ST12-5 to repeat the above-mentioned operation.

With this control, even when the surface of the object 7 to be measured is wavy like a steel plate, the distance $d_1$ to the object to measured can be reliably adjusted, and even when the distance to the object to be measured changes, the velocity can be reliably measured.

Figure 8:
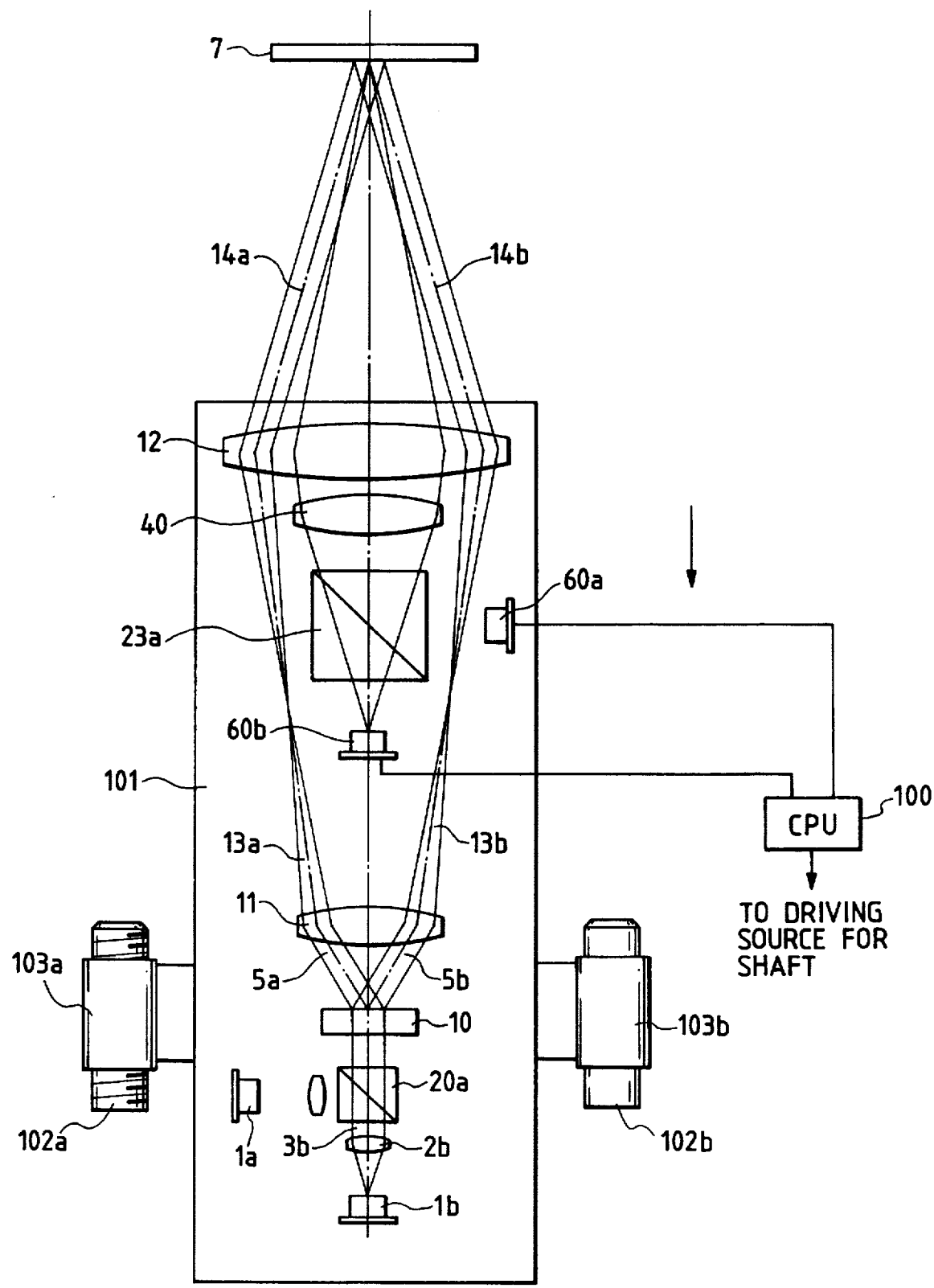
FIG. 8 is an optical path diagram of divergent light in the third embodiment of the present invention.
Figure 9:
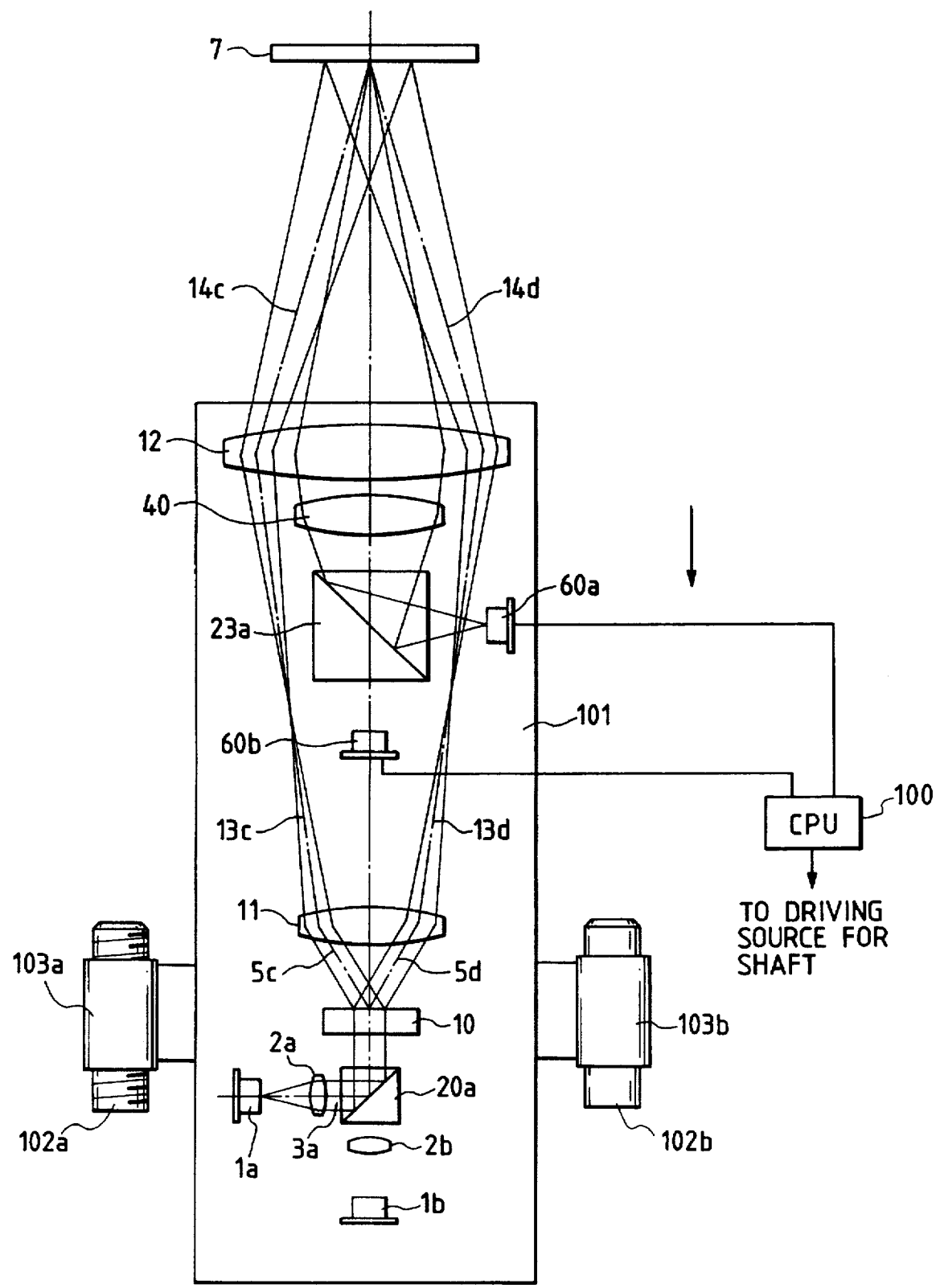
FIG. 9 is an optical path diagram of collimated light in the third embodiment of the present invention.

FIGS. 8 and 9 show the arrangement of a laser Doppler velocimeter according to the third embodiment of the present invention. FIG. 8 shows the optical path portion of collimated light, and FIG. 9 shows the optical path portion of divergent light.

A laser beam having a wavelength λ of about 0.68 μm and emitted from a laser diode 1b is collimated by a collimator lens 2b into a collimated beam 3b having a beam spot size of 1.2 mm, and the collimated beam 3b is transmitted through a dichroic mirror 20a which is set to reflect light having a wavelength falling within a range of 0.78±10 μm. The collimated beam 3b is then incident on a transmission type diffraction grating having a grating line pitch dg=3.2 μm in a direction perpendicular to the grating line alignment direction of the diffraction grating 10, and is split into ±1st-order diffracted light components 5a and 5b.

The ±1st-order diffracted light components 5a and 5b emerge from the diffraction grating 10 at a diffraction angle θ=12°, and are incident on a convex lens 11 having a focal length f, thus obtaining light beams 13a and 13b, as shown in FIG. 8. The light beams 13a and 13b are incident on a convex lens 12, thus obtaining light beams 14a and 14b, as shown in FIG. 8. When the distance between the lenses 11 and 12 is set to convert these light beams 14a and 14b into collimated beams, the light beams 14a and 14b are incident on an object 7 to be measured to have an incident angle equal to the diffraction angle θ from the above-mentioned diffraction grating 10, and a spot size of 1.2 mm.

With these beams, interference fringes are formed on the object 7 to be measured at a predetermined interval, and when the diffraction angle θ is equal to an angle $θ_n$ half the crossing angle of the two light beams on the object to be measured, an interference pitch p is given by the following equation, as described above:

$$p=dg/2 \tag{6}$$

Light reflected by the object 7 to be measured on the basis of the interference fringe pitch p is transmitted through the lens 12, and is then transmitted through a dichroic mirror 23a, which is set to have the same reflection wavelength range as that of the dichromic mirror 20a, via a focusing lens 40. The reflected light is then incident on a photodetector 60a. Therefore, when the object 7 to be measured is moving at a velocity V, a Doppler frequency F given by equation (7) above can be obtained from an optical signal including a Doppler frequency signal obtained by the photodetector 60a, i.e., a measurement signal. A CPU 100 calculates the velocity based on equation (7).

$$F=2V/dg \tag{7}$$

On the other hand, a laser beam having a wavelength $λ_1$=780 nm and emitted from a laser diode 1a is collimated by a collimator lens 2a into a collimated beam 3a, and is perpendicularly reflected by the dichroic mirror 20a. The collimated beam 3a is incident on the diffraction grating 10 in a direction perpendicular to the grating line alignment direction of the diffraction grating 10 as in the light beam 3b, and is split into light beams 5c and 5d. The light beams 5c and 5d are transmitted through the convex lenses 11 and 12, and are converted into divergent beams 14c and 14d. The divergent beams 14c and 14d are incident at substantially the same positions (on the light-receiving optical axis) as the incident positions of the collimated light beams 14a and 14b. With these beams, interference fringes whose fringe interval depends on the depth (the up-and-down direction in FIGS. 8 and 9) are formed on the object 7 to be measured. An interference fringe pitch $p_1$ of the interference fringes is given by the following equation (8)':

$$p_1=λ_1/2 \sin θ_n \tag{8}$$

where $θ_n$ is the crossing angle of the central rays in the light beam crossing portion.

Light reflected by the object 7 to be measured on the basis of the interference fringe pitch $p_1$ is transferred through the lens 12, and is reflected by the dichroic mirror 23a via the focusing lens 40. The reflected light is then incident on a photodetector 60a. A Doppler frequency $F_1$ of a Doppler frequency signal obtained by the photodetector 60a, i.e., a reference signal, is given by the following equation (9)':

$$F_1 = 2V \sin \theta_n / \lambda_1 \tag{9}'$$

The pitch $p_1$ of the interference fringes, formed at a position in the depth direction (the up-and-down direction in FIGS. 8 and 9) where the crossing angle $\theta_n$ of the central rays in the light beam crossing portion becomes equal to the diffraction angle $\theta$, is $\lambda_1/\lambda$ times the interference fringe pitch p given by equation (6), and the position in the depth direction is substantially equal to a position where the collimated light beams emerging from the convex lens 12 cross each other.

Therefore, as the Doppler frequency signal obtained in correspondence with the moving velocity V of the moving object 7 to be measured, if the crossing position of the collimated beams 14a and 14b emerging from the convex lens 12 is defined as a proper measurement point, when the object 7 to be measured is present before (the lower side in FIGS. 8 and 9) this proper measurement point, the photodetector 60a generates a Doppler frequency signal having a frequency higher than that $\lambda_1/\lambda$ times of the frequency of the measurement signal output from a photodetector 60b, i.e., a reference signal.

Based on the reference signal, screw shafts 102a and 102b constituting a mechanism for moving a main body are rotated by a driving source (not shown), and move a velocimeter body 101, on which cylindrical nuts 103a and 103b to be threadably engaged with the screw shafts 102a and 102b project from the two sides, in the direction of an arrow in FIGS. 8 and 9 until the Doppler frequency of the reference signal obtained from the photodetector 60a becomes $\lambda_1/\lambda$ times of the Doppler frequency of the measurement signal obtained from the photodetector 60b. When the object 7 to be measured is present after the proper measurement point (the upper side in FIGS. 8 and 9), control opposite to the above-mentioned control is executed. This control is performed by the CPU 100. More specifically, the interval between the velocimeter body 101 and the object 7 to be measured is discriminated and controlled by the CPU 100.

The control operation of the CPU 100 of the third embodiment will be described below with reference to the flow chart in FIGS. 10A and 10B.

After the power supply of the velocimeter body 101 is turned on in step ST11-1, the screw shaft 102a is rotated in step ST11-2 to move the velocimeter body 101 up (upward) or down (downward) with respect to the object 7 to be measured. It is checked in step ST11-3 if the Doppler frequencies of the outputs from the photodetectors 60a and 60b satisfy $F_1=(\lambda_1/\lambda) \times F$ during movement of the velocimeter body 101. If YES in step ST11-3, it is determined that the velocimeter body 101 has reached the proper measurement position, and the screw shaft 102a is stopped in step ST11-4 to stop the velocimeter body, thus maintaining this state.

When the velocimeter body 101 has reached the proper position, servo control is started. It is checked in step ST11-5 if the Doppler frequency $F_1$ of the output from the photodetector 60b has a predetermined proportional relationship, i.e., $F_1 = (\lambda_1/\lambda) \times F$, with that of the output from the photodetector 60a. If NO in step ST11-5, it is checked in step ST11-6 if $F_1 > (\lambda_1/\lambda) \times F$. If YES in step ST11-6, the screw shaft 102a is rotated in step ST11-7 to move the velocimeter body 101 down, thus bringing it close to the object 7 to be measured. It is checked again in step ST11-8 if $F_1 = (\lambda_1/\lambda) \times F$. If YES in step ST11-8, the screw shaft 102a is stopped in step ST11-9, thus stopping the velocimeter body 101 at that position.

On the other hand, if NO in step ST11-6, the flow advances to step ST11-10 to rotate the screw shaft 102a in a direction opposite to that described above, thus moving the velocimeter body 101 up, and bringing it farther from the object 7 to be measured. It is checked again in step ST11-11 if $F_1=(\lambda_1/\lambda) \times F$. If YES in step ST11-11, the flow advances to step ST11-9 to stop the screw shaft 102a, thereby stopping the velocimeter body 101. It is checked in step ST11-12 if an operation ends. If NO in step ST11-12, the flow returns to step ST11-5 to repeat the above-mentioned operation.

With this control, even when the surface of the object 7 to be measured is wavy like a steel plate, the distance to the object 7 to be measured can be reliably adjusted. Therefore, a laser Doppler velocimeter which can reliably measure the velocity even when the distance to the object 7 to be measured changes can be realized.

Figure 11:
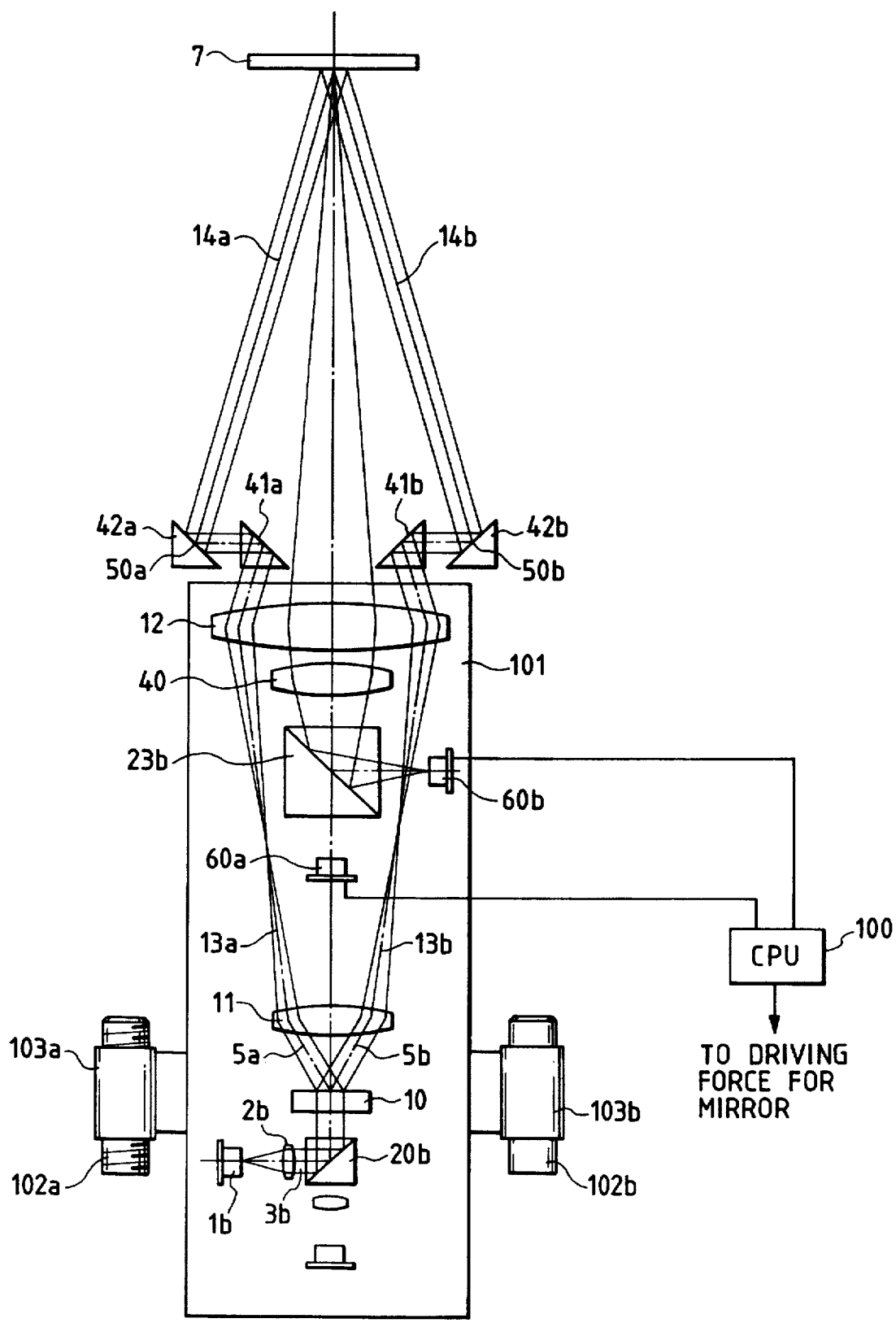
FIG. 11 is an optical path diagram of collimated light in the fourth embodiment of the present invention.
Figure 12:
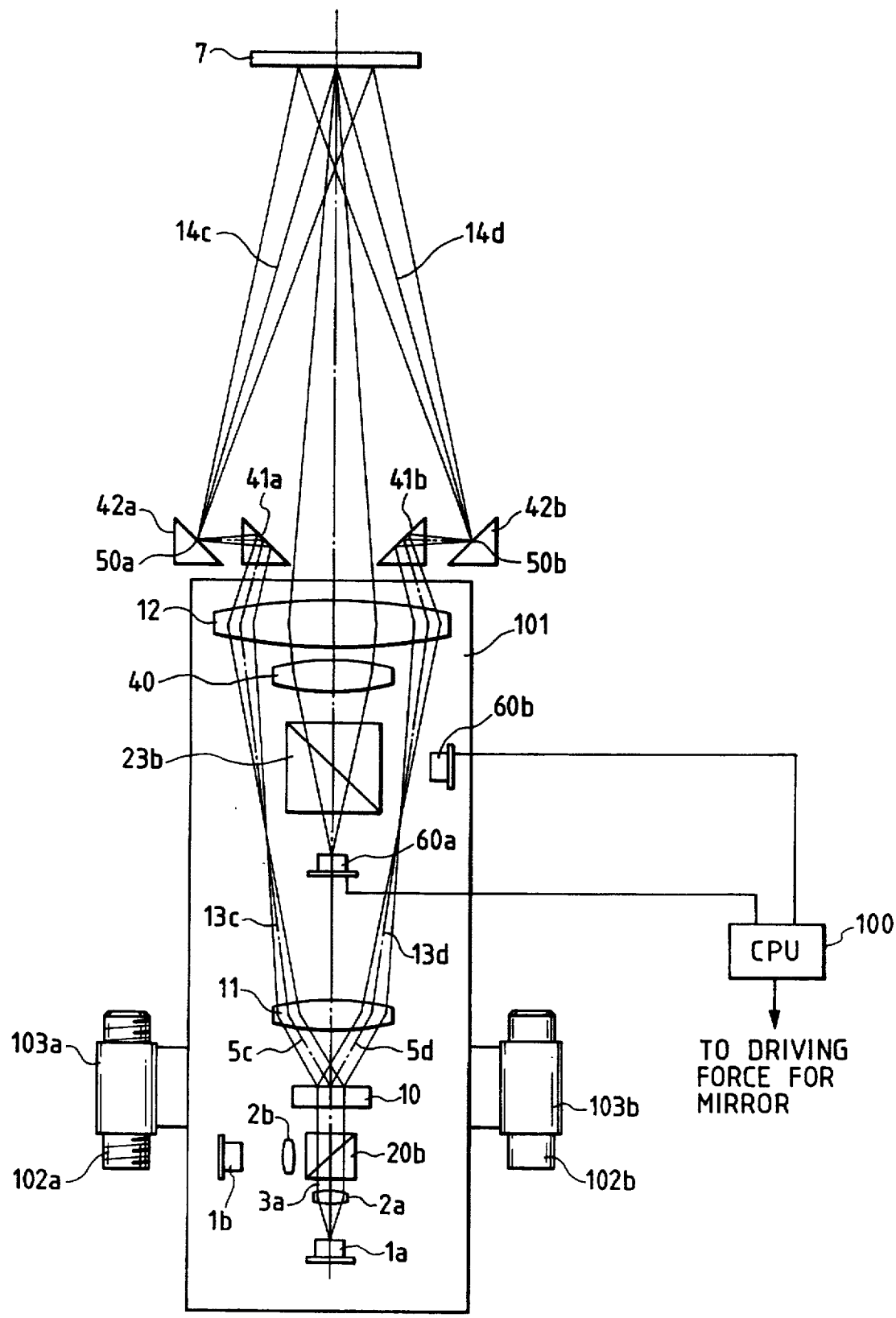
FIG. 12 is an optical path diagram of divergent light in the fourth embodiment of the present invention.

FIGS. 11 and 12 show the arrangement of a laser Doppler velocimeter according to the third embodiment of the present invention. FIG. 11 shows the optical path portion of collimated light, and FIG. 12 shows the optical path portion of divergent light.

In the fourth embodiment, pairs of mirrors 41a and 42a, and 41b and 42b are respectively inserted in the optical paths of the light beams 14a and 14b transmitted through the lens 12, unlike in the third embodiment. The mirrors 41a and 42a, and the mirrors 41b and 42b are arranged, so that their reflection surfaces become parallel to each other, and the mirrors denoted by the same reference numerals are arranged to be symmetrical about the light-receiving optical axis. The mirrors 41a and 41b are movable in the interval direction to be symmetrical about the light-receiving optical axis. Contrary to the above embodiment, when light is transmitted through a dichroic mirror 20b, it is converted into convergent light; when light is reflected by the dichroic mirror 20b, it is converted into collimated light. Also, the arrangement of a dichroic mirror 23b and the photodetectors 60a and 60b is opposite to that in the third embodiment. Since other arrangements are the same as those in the third embodiment, the same reference numerals in this embodiment denote the same parts as in the third embodiment, and a repetitive description thereof will be avoided.

The operation of the fourth embodiment will be described below. Since the two collimated beams 14a and 14b propagate in substantially the same manner as in the third embodiment, except that they propagate via the mirrors 41a, 42a, 41b, and 42b, a description thereof will be omitted. The positions of prisms are set, so that two convergent beams 14c and 14d transmitted through the lens 12 are focused on points 50a and 50b on the mirrors 42a and 42b via the mirrors 41a and 41b. A distance (ideal distance) $d_1$ between the points 50a and 50b on the mirrors 42a and 42b, and the object 7 to be measured is obtained by calculating the following equation by the CPU 100. Note that X is the interval between the points 50a and 50b, which is measured by a measurement means (not shown).

$$d_1 = X/(2 \tan \theta_n) \tag{10}'$$

Furthermore, from equations (7) and (8)', we have:

$$d_1 = X / \left( 2\tan \left( \sin^{-1} \left( \frac{F_1}{F} \cdot \frac{\lambda_1}{d_g} \right) \right) \right) \tag{11}'$$

If $\theta$ is sufficiently small, and the variation, in the depth direction, of the object 7 to be measured is small, the displacement, in the direction of the light-receiving optical axis, of the points 50a and 50b upon movement of the mirrors 41a and 41b is negligibly small. For this reason, using equation (11)', the distance $d_1$ between the points 50a and 50b, and the object 7 to be measured, and the variation in this distance can be obtained. On the other hand, the distance d between the crossing position of the light beams 14a and 14b, and the points 50a and 50b is given by $d=X/(2\tan\theta)$.

Figure 13B:
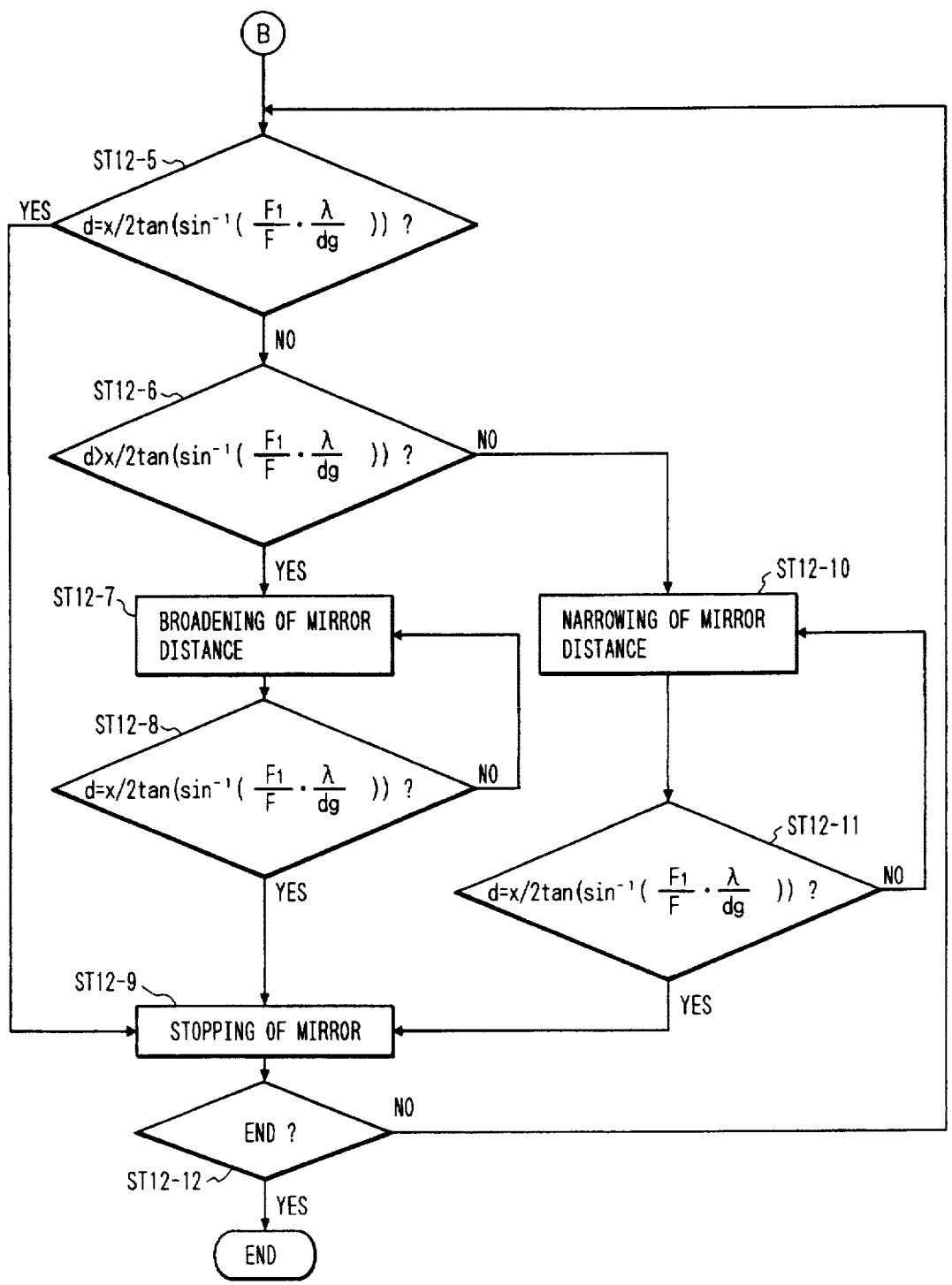
FIG. 13 is comprised of FIGS. 13A and 13B showing flow charts for explaining a control operation of the fourth embodiment.

The control operation of the CPU 100 of the fourth embodiment will be described below with reference to the flow chart in FIGS. 13A and 13B.

After the power supply is turned on in step ST12-1, the interval X between the mirrors 41a and 41b is increased or decreased by exciting, e.g., a voice coil in step ST12-2. It is checked in step ST12-3 if $$d = X/2\tan\left(\sin^{-1}\left(\frac{F_1}{F} \cdot \frac{\lambda_1}{dg}\right)\right).$$

If YES in step ST12-3, the mirrors 41a and 41b are stopped in step ST12-4.

After the mirrors 41a and 41b are arranged at proper positions, the operation for controlling the positions of the mirrors 41a and 41b to satisfy $d_1=d$ (where $d_1$ is the ideal distance and d is the distance between the crossing position of the two collimated beams 14a and 14b transmitted through the lens 12, and the points 50a and 50b on the mirrors 42a and 42b) is started.

It is checked in step ST12-5 if $$d = X/2\tan\left(\sin^{-1}\left(\frac{F_1}{F} \cdot \frac{\lambda_1}{dg}\right)\right).$$

If NO in step ST12-5, it is checked in step ST12-6 if $$d > X/2\tan\left(\sin^{-1}\left(\frac{F_1}{F} \cdot \frac{\lambda_1}{dg}\right)\right).$$

If YES in step ST12-6, the flow advances to step ST12-7 to increase the interval X between the mirrors 41a and 41b. Thereafter, it is checked again in step ST12-8 if $$d = X/2\tan\left(\sin^{-1}\left(\frac{F_1}{F} \cdot \frac{\lambda_1}{dg}\right)\right).$$

If YES in step ST12-8 the flow advances to step ST12-9 to stop the mirrors 41a and 41b.

On the other hand, if NO in step ST12-6, the interval X between the mirrors 41a and 41b is decreased in step ST12-10, and it is checked in step ST12-11 if $$d = X/2\tan\left(\sin^{-1}\left(F \cdot \frac{\lambda_1}{dg}\right)\right).$$

If YES in step ST12-11, the flow advances to step ST12-9 to stop the mirrors 41a and 41b. It is then checked in step ST12-12 if an operation ends. If NO in step ST12-12, the flow returns to step ST12-5 to repeat the above-mentioned operation. With this control, even when the surface of the object 7 to be measured is wavy like a steel plate, the distance d to the object to measured can be reliably adjusted, and even when the distance to the object to be measured changes, the velocity can be reliably measured.

In addition to the arrangement using the two light sources as in the above embodiment, the light sources may be replaced by a single two-frequency laser. In this case, the optical paths of the light sources need not be split by the dichroic mirror 20a or 20b. Light components having different wavelengths are guided in different directions by the dichroic mirror 23 before the focusing lens, and the same effect as described above can be obtained.

In the description of the above embodiment, the light beams 14c and 14d are divergent beams. However, these beams may be convergent beams. In this case, the moving direction of the main body or mirrors is reversed to that in the above embodiment.

What is claimed is:

1. A position information detection apparatus comprising:

a first detection system for radiating two collimated light beams onto an object to be measured at a crossing angle to form interference fringes at a predetermined interval, said first detection system detecting scattered light emanating from the object to be measured by the interference fringes at the predetermined interval;

a second detection system for radiating two light beams onto the object to be measured at a crossing angle to form interference fringes having a gradient with each other in an opposing direction to the object to be measured, said second detection system detecting scattered light emanating from the object to be measured by the interference fringes having the gradient; and detection means for comparing output signals from said first and second detection systems, and detecting relative position information of the object to be measured, along an opposing direction of said first and second detection systems to the object to be measured.

2. An apparatus according to claim 1, wherein said first and second detection systems split a light beam from a common light source to form two pairs of light beams which cross at different positions.

3. An apparatus according to claim 1, further comprising interval control means for controlling an interval between said first and second detection systems and the object to be measured on the basis of a detection result from said detection means.

4. An apparatus according to claim 1, further comprising crossing position control means for changing a relationship between the detection system and the crossing position of the two beams in each of said first and second detection systems on the basis of a detection result from said detection means.

5. An apparatus according to claim 1, wherein said first and second detection systems respectively have light sources having different output light wavelengths, and each guide two light beams formed from a light beam emitted from the corresponding light source to cross each other.

6. An apparatus according to claim 5, wherein said first and second detection systems guide the light beams from the corresponding light sources to the object to be measured via a common optical system.

7. An apparatus according to claim 1, wherein said first and second detection systems each guide the two light beams to cross at substantially the same position on the object to be measured.

8. A velocimeter comprising:

a first detection system for radiating two collimated light beams onto an object to be measured at a crossing angle to form interference fringes at a predetermined interval, said first detection system detecting scattered light emanating from the object to be measured by the interference fringes at the predetermined interval;

velocity information detection means for detecting moving velocity information relative to the object to be measured on the basis of an output signal from said first detection system;

a second detection system for radiating two light beams onto the object to be measured at a crossing angle to form interference fringes having a gradient with each other in an opposing direction to the object to be measured, said second detection system detecting scattered light emanating from the object to be measured by the interference fringes having the gradient; and relative position information detection means for comparing output signals from said first and second detection systems, and detecting relative position information of the object to be measured, along an opposing direction of said first and second detection systems to the object to be measured.

9. A velocimeter according to claim 8, wherein said relative position information detection means detects a distance to the object to be measured along the opposing direction.

10. A velocimeter according to claim 8, wherein said relative position information detection means detects whether or not the object to be measured is present at a proper position in the opposing direction.

11. A velocimeter according to claim 8, wherein said first and second detection systems split a light beam from a common light source to form two pairs of light beams which cross at different positions.

12. A velocimeter according to claim 8, further comprising interval control means for controlling an interval between said first and second detection systems and the object to be measured on the basis of a detection result from said relative position information detection means.

13. A velocimeter according to claim 8, further comprising crossing position control means for changing a relationship between the detection system and the crossing position of the two beams in each of said first and second detection systems on the basis of a detection result from said relative position information detection means.

14. A velocimeter according to claim 8, wherein said first and second detection systems respectively have light sources having different output light wavelengths, and each guide two light beams formed from a light beams emitted from the corresponding light source to cross each other.

15. A velocimeter according to claim 14, wherein said first and second detection systems guide the light beams from the corresponding light sources to the object to be measured via a common optical system.

16. A velocimeter according to claim 8, wherein said first and second detection systems each guide the two light beams to cross at substantially the same position on the object to be measured.

17. A position information detection apparatus comprising:

a first detection system for radiating two collimated light beams onto an object to be measured at a crossing angle to form interference fringes at a predetermined interval, said first detection system detecting scattered light emanating from the object to be measured by the interference fringes at the predetermined interval;

a second detection system for radiating two light beams onto the object to be measured at a crossing angle to form interference fringes having a gradient with each other, said second detection system detecting scattered light emanating from the object to be measured by the interference fringes having the gradient; and signal processing unit for comparing output signals from said first and second detection system, and detecting relative position information of the object to be measured, along a direction differing from a direction of arrangement of the interference fringes at the predetermined interval.

18. An apparatus according to claim 17, wherein said second detection system radiates said two light beams to form interference fringes having a gradient with each other in an opposing direction thereof to the object to be measured.

19. An apparatus according to claim 17, further comprising means for detecting velocity information of the object to be measured along the direction of arrangement of the interference fringes at the predetermined interval on the basis of the output signal from said detection system.

\* \* \* \* \*

UNITED STATES PATENT AND TRADEMARK OFFICE
CERTIFICATE OF CORRECTION

PATENT NO. : 5,502,466
DATED : March 26, 1996
INVENTOR(S) : Kato et al.

It is certified that error appears in the above-indentified patent and that said Letters Patent is hereby corrected as shown below:

COLUMN 7:

Line 58, "to" should read --to be--.

COLUMN 11:

Line 46, "ST12-8" should read --ST12-8,--;

Line 51, "$d = X/2\tan\left(\sin^{-1}\left(F \cdot \dfrac{\lambda_1}{dg} \cdot \right)\right)$" should read --$d = X/2\tan\left(\sin^{-1}\left(\dfrac{F_1}{F} \cdot \dfrac{\lambda_1}{dg} \cdot \right)\right)$--

Line 61, "to " should read --to be--.

UNITED STATES PATENT AND TRADEMARK OFFICE
CERTIFICATE OF CORRECTION

PATENT NO. : 5,502,466　　　　　　　　　　Page 2 of 2
DATED : March 26, 1996
INVENTOR(S) : Kato et al.

It is certified that error appears in the above-indentified patent and that said Letters Patent is hereby corrected as shown below:

COLUMN 14:

Line 1, "a" should be deleted; and
Line 25, "system," should read --systems,--.

Signed and Sealed this

Tenth Day of December, 1996

Attest:

BRUCE LEHMAN

Attesting Officer　　　Commissioner of Patents and Trademarks